United States Patent [19]
Lew et al.

[11] Patent Number: 5,347,875
[45] Date of Patent: Sep. 20, 1994

[54] CAPACITOR-COUPLED OHMIC RESISTANCE POSITION SENSOR

[76] Inventors: Hyok Sang Lew; Yon Sung Lew, both of 7890 Oak St., Arvada, Colo. 80005

[21] Appl. No.: 36,953

[22] Filed: Mar. 25, 1993

[51] Int. Cl.$^5$ .................. G01F 1/22; G01F 23/68
[52] U.S. Cl. .................. 73/861.56; 73/313; 340/870.37
[58] Field of Search .................. 73/313, 314, 304 C, 73/861.56; 324/649, 691, 699, 701, 709, 713, 704, 716; 340/686, 870.37, 870.38

[56] References Cited

U.S. PATENT DOCUMENTS

| | | | |
|---|---|---|---|
| 3,636,449 | 1/1972 | Partridge | 340/870.38 X |
| 4,290,065 | 9/1981 | Gleason | 340/870.38 |
| 4,560,986 | 12/1985 | Lew et al. | 73/313 X |
| 4,641,523 | 2/1987 | Andreasson | 73/313 |
| 4,951,506 | 8/1990 | Lew | 324/716 X |

Primary Examiner—Herbert Goldstein

[57] ABSTRACT

A position sensor comprises a pair of elongated members of strip or tape shape having a high specific ohmic resistance, and a target member capacitively coupling two electric signals respectively flowing through the pair of elongated members, which target member is disposed in a relationship allowing sliding movements following the pair of elongated members, wherein the position of the target member relative to a reference section of the pair of elongated members is determined as a function of a phase angle difference between an alternating electrical signal supplied to one extremity of one of the pair of elongated members and another alternating electrical signal associated with the supplied electrical signal and taken off from one extremity of the other of the pair of elongated members.

20 Claims, 4 Drawing Sheets

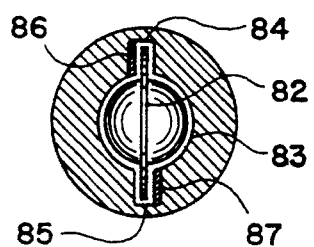
Fig. 11
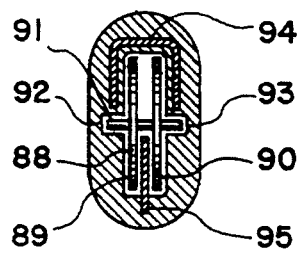
Fig. 12
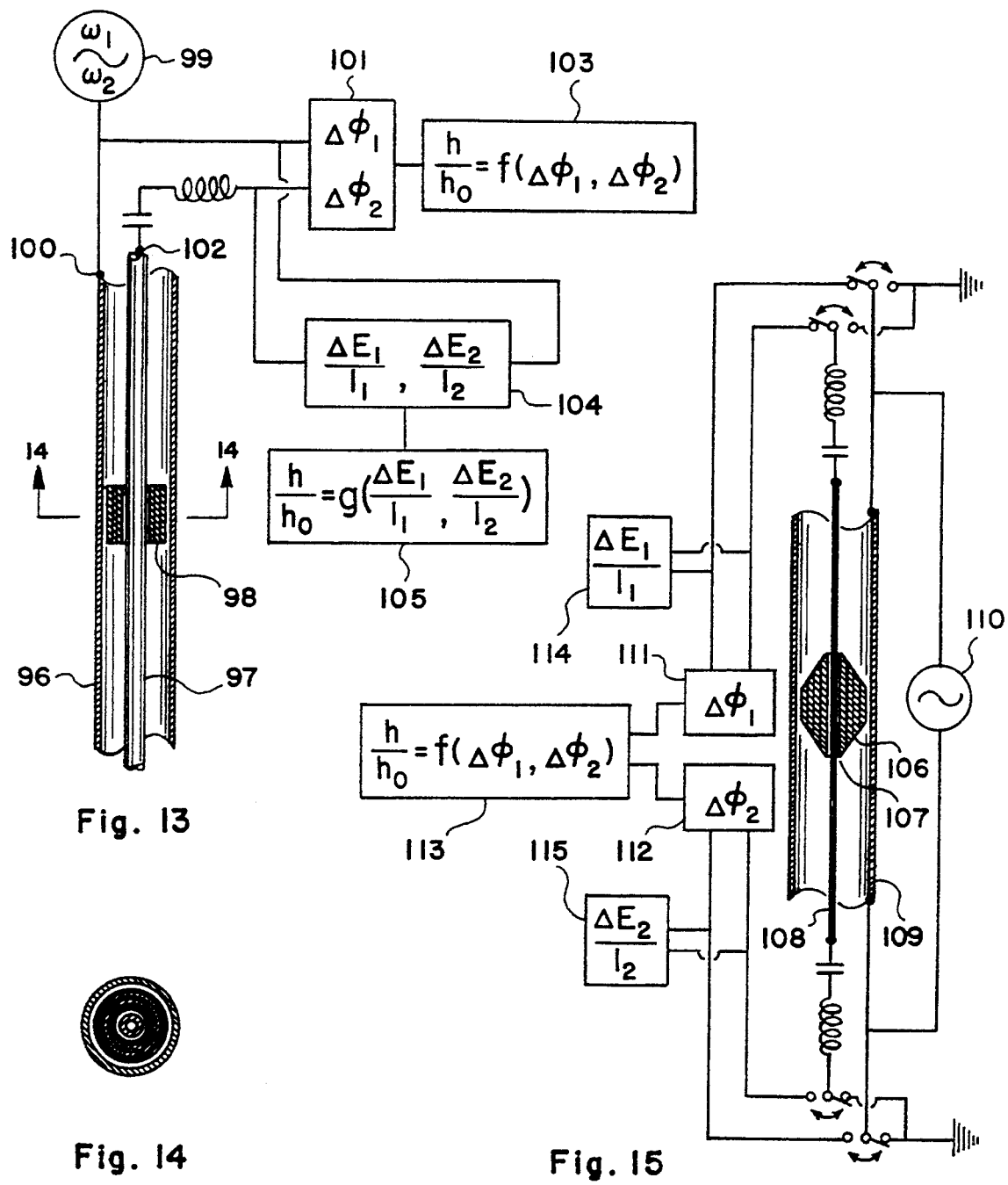
Fig. 13
Fig. 14
Fig. 15

CAPACITOR-COUPLED OHMIC RESISTANCE POSITION SENSOR

FIELD OF INVENTION

This invention relates to a method and device for remotely measuring position of a target member moving along a pair of parallel elongated members with high specific ohmic resistance without establishing electrically conducting contact with the pair of parallel elongated members.

BACKGROUND OF INVENTION

The typical embodiments of the conventional ohmic resistance position sensors employ a pair of parallel elongated members with high specific ohmic resistance, and a target member moving along the pair of parallel elongated members in a sliding or rolling motion, that establishes an electrical connection between the pair of parallel elongated members, wherein the numerical values of the ohmic resistances of two electric circuits respectively comprising a first portion of the pair of parallel elongated members located on one side of the target member and the target member, and a second portion of the pair of parallel elongated members located on the other side of the target member and the target member, are used to determine the position of the target member independent of the numerical value of the contact resistance arising from the electrical connection established by the target between the pair of parallel elongated members. These types of the ohmic resistance position sensors are disclosed in U.S. Pat. Nos. 4,560,986, 4,730,491, and 4,796,472 issued on inventions made by one of the two coinventors of the present invention. One major set back of the aforementioned types of the ohmic resistance position sensor is that the position sensor cannot be immersed into liquid media or exposed to contaminating environments, as the pair of parallel elongated members with exposed surfaces for electrically conducting contact with the target come in contact with the environments and erodes altering the characteristics of resistivity. The present invention teaches a position sensor, that can be immersed into liquid media or exposed to contaminating environments.

BRIEF SUMMARY OF INVENTION

The primary object of the present invention is to provide a position sensor comprising a pair of parallel elongated members with high specific ohmic resistance, each of which pair of parallel elongated members is clad or sheathed with an electrically insulating material, and a target member clad or covered with an electrically insulating material and providing a capacitive coupling disposed intermediate the pair of parallel elongated members in a freely moving relationship along the length of the combination of the pair of parallel elongated members, which target member capacitively couples two electric currents respectively flowing through the pair of parallel elongated members, wherein the position of the target member providing capacitive coupling along the pair of parallel elongated members is determined as a function of the phase angle difference between an alternating electromotive force supplied to one extremity of an electric circuit comprising a first portion of the pair of parallel elongated members located on one side of the target member and the target member, and an alternating electromotive force existing at the other extremity of the electric circuit.

Another object is to provide a position sensor having the same structural embodiment as that described in the afore-mentioned primary object wherein the position of the target member providing capacitive coupling is determined as a function of a first phase angle difference between an alternating electromotive force supplied to one extremity of a first electric circuit comprising a first portion of the pair of parallel elongated members located on one side of the target member and the target member, and an alternating electromotive force existing at the other extremity of the first electric circuit, and of a second phase angle difference between an alternating electromotive force supplied to one extremity of a second electric circuit comprising a second portion of the pair of parallel elongated members located on the other side of the target member and the target member, and an alternating electromotive force existing at the other extremity of the second electric circuit.

A further object is to provide a position sensor having the same structural embodiment as that described in the afore-mentioned primary object, wherein the position of the target member providing capacitive coupling is determined as a function of a drop in amplitude of an alternating electromotive force across one of the first and second electric circuits defined in the afore-mentioned another object.

Yet another object is to provide a position sensor having the same structural embodiment as that described in the afore-mentioned primary object wherein the position of the target member providing capacitive coupling is determined as a function of a first drop in amplitude of an alternating electromotive force across the first electric circuit defined in the afore-mentioned another object, and of a second drop in amplitude of an alternating electromotive force across the second electric circuit defined in the afore-mentioned another object.

Yet a further object is to provide a liquid level sensor operating on the principles of the present invention teaching the afore-mentioned position sensors.

Still another object is to provide a rotameter operating on the principles of the present invention teaching the aforementioned position sensors.

Still a further object is to provide a tandem rotameter operating on the principles of the present invention teaching the afore-mentioned position sensor.

These and other objects of the present invention will become clear as the description of the invention progresses.

BRIEF DESCRIPTION OF FIGURES

The present invention may be described with a greater clarity and specificity by referring to the following figures:

FIG. 11 illustrates a cross section of yet other embodiment of the position sensor.

FIG. 12 illustrates a cross section of still other embodiment of the position sensor.

FIG. 13 illustrates an embodiment of the position sensor comprising a hollow coaxial combination of a cylindrical elongated member and an elongated rod, and a target member providing capacitive coupling.

FIG. 14 illustrates a cross section of an embodiment of the coaxial position sensor.

FIG. 15 illustrates another embodiment of the coaxial position sensor.

DESCRIPTION OF ILLUSTRATED EMBODIMENTS

Figure 1:
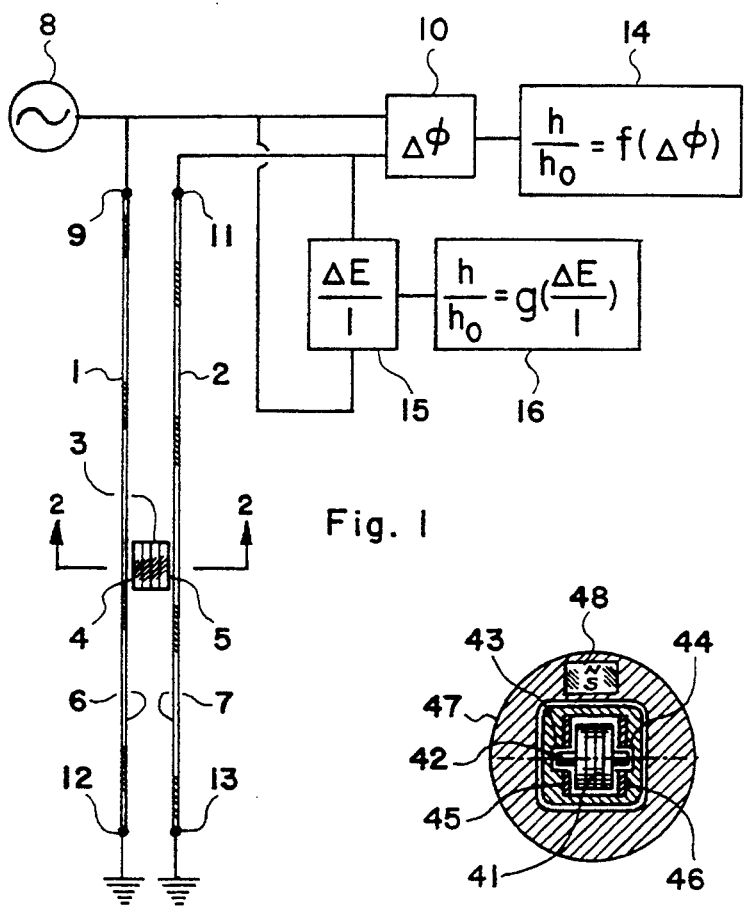
FIG. 1 illustrates an embodiment of the position sensor operating on the principles of the present invention, that comprises a pair of elongated strips and a target providing capacitive coupling.

In FIG. 1, there is illustrated an embodiment of the position sensor constructed in accordance with the principles of the present invention, that comprises a pair of parallel elongated members clad or coated with insulating layers and a target member providing an electrical capacitance that is encapsulated within an insulating coating, and a schematic diagram showing a version of the operating principles of the present invention. The pair of parallel elongated members 1 and 2 are disposed in a parallel and side-by-side relationship in a direction along which the position of target member 3 is to be measured. It is preferred that each of the pair of elongated members 1 and 2 is an elongated tape made of an electrically conducting material and clad or coated with an electrically insulating material, wherein at least one of the pair of elongated members 1 and 2 has a high specific ohmic resistance (high value of ohmic resistance per unit length of the tape). The pair of parallel elongated members 1 and 2 having the construction of a tape or strip is disposed in a face-to-face relationship, and the target 3 having two opposite parallel end faces 4 and 5 is disposed between the inside faces 6 and 7 of the two elongated members 1 and 2 in a freely movable relationship following the length of the two parallel elongated members, wherein each of the two parallel end faces of the target member 3 stays at a close proximity to the inside face of the two elongated members 1 and 2 during all phases of the movement of the target member 3 following the two elongated members I and 2. Each of the two opposite parallel end faces 4 and 5 of the target member 3 must have a flat metallic surface clad or be coated with a thin insulating layer, whereby the metallic surface maintains a parallel and close proximity relationship with each of the inside faces 6 and 7 of the two parallel elongated members. The target member 3 may comprise a single or multiple metallic plates insulated from one another and stacked into a parallel relationship, whereby the target member 3 in conjunction with the two elongated members plays the role of an electric capacitor that capacitively couples two electrical currents respectively flowing through the two elongated members 1 and 2. The insulated surfaces of the two opposite parallel end faces 4 and 5 of the target member 3 may or may not be in contact respectively with the insulated surfaces of the inside faces 6 and 7 of the two parallel elongated members 1 and 2 respectively having the shape of a tape or strip. Either the target member 3 is built into or connected to a marker such as a float of the liquid level sensor and a drag body in the rotameter of which position relative to one extremity of the two elongated members 1 and 2 is to be measured or detected. In other applications, the target member 3 may be fixed in space, while the combination of the two parallel elongated members 1 and 2 is made to move with a marker of which position relative to the target member 3 is under measurement.

A power supply 8 supplies an alternating electromotic force to a first extremity 9 of one of the two elongated members 1 and 2. The two input terminal included in a phase angle detector 10 are respectively connected to the first extremities 9 and 11 of the two elongated members 1 and 2. The second extremities 12 and 13 of the two elongated members may be grounded to ensure a stable operation of the position sensing. The phase angle difference $\Delta\phi$ between the two electromotive forces respectively supplied to the two input terminals of the phase angle detector 10 is given by equation $$\tan\Delta\phi = \left[ \frac{1}{\omega(C + C_0)} - \omega L_0 \right] / (\alpha h \Omega + R_0), \quad (1)$$

where $\omega$ is the circular frequency of the alternating electromotive force supplied by the power supply or power source 8, $C_O$ and $L_0$ are respectively the circuit capacitance and inductance inherent to the continuous wiring of the electric circuit, C is the coupling capacitance contributed by the target member 3 in capacitively coupling the two elongated members 1 and 2, h is the distance from the first extremities 9 and 11 of the pair of elongated members to the target member 3, $\Omega$ is the ohmic resistance per unit length of each of the two parallel elongated members, $R_0$ is the ohmic resistance inherent to the wiring of the electric circuit excluding one or both of the two elongated members 1 and 2, and $\alpha$ is a parameter that is equal to 1 or 2 depending on whether one or both of the two elongated members 1 and 2 have a high specific ohmic resistance $\Omega$. When equation (1) is solved for h, the following equation results:

$$h = \left[ \frac{\frac{1}{\omega(C + C_0)} - \omega L_0}{\tan\Delta\phi} - R_0 \right]/\alpha\Omega. \quad (2)$$

If the capacitance, inductance and resistance inherent to the connecting wiring in the electric circuit shown in FIG. 1 are negligibly small, equation (2) simplifies to the form $$h = \frac{1}{\alpha\omega\Omega C \tan\Delta\phi}. \quad (3)$$

According to equation (2) or (3), the distance between the first extremities 9 and 11 of the two parallel elongated members 1 and 2, and the target member 3 can be determined as a function of the phase angle difference between two electromotive forces respectively taken at the first extremities 9 and 10 of the two parallel elongated members 1 and 2. The functional relationship can be easily modified to measure the position of the target member 3 relative to other reference section stationary relative to the combination of the two parallel elongated members. In actual practice of the present invention, an empirically obtained mathematical relationship between the position of the target member 3 and the phase angle difference $\Delta\phi$ should be used in determining the position of the target 3 instead of the theoretically derived equation (2) or (3), and an electronic data processor 14 receiving the information on the phase angle difference $\Delta\phi$ from the phase angle detector 10 executes the algorithm that determines the position h as a function of the phase angle difference $\Delta\phi$. It should be understood that the optimum circular frequency $\omega$ providing a maximum sensitivity in the measurement of the position of the target member 3 should be employed in the operation of the position sensor. Of course, the numerical values ($\alpha\Omega$) and C, and other circuit parameters must be determined empirically by calibrating the position sensor.

It is well understood fact that the drop in an alternating electromotive force between the two extremities 9 and 10 of the two parallel elongated members 1 and 2 is given by equation $$\Delta E = I\sqrt{\left[\frac{1}{\omega(C + C_0)} - \omega L_0\right]^2 + (\alpha h\Omega + R_0)^2}, \quad (4)$$

where $\Delta E$ and I are respectively the amplitudes or root-mean-square values of the drop in the alternating electromotive force across the two extremities 9 and 11 and of the alternating electric current flowing through the first extremities 9 and 11 of the two parallel elongated members. In this mode of operation, the grounding at the second extremities 12 and 13 of the two parallel elongated members should be disconnected. An improved result can be obtained when the averaged value of the two values of the alternating electrical currents respectively measured at the two extremities 9 and 10 of the two parallel elongated members is used for the numerical value of I appearing in equation (4). When equation (4) is solved for h, the following equation results:

$$h = \left\{\sqrt{\left(\frac{\Delta E}{I}\right)^2 - \left[\frac{1}{\omega(C + C_0)} - \omega L_0\right]^2} - R_0 \right\}/\alpha\Omega. \quad (5)$$

When the capacitance, inductance and resistance inherent to the connection wiring in the electric circuit shown in FIG. 1 are negligibly small, equation (5) reduces to a simpler form $$h = \sqrt{\left(\frac{\Delta E}{I}\right)^2 - \left(\frac{1}{\omega C}\right)^2}/\alpha\Omega. \quad (6)$$

According to equation (5) or (6), the position of the target member 3 can be determined as a function of a ratio of the drop in the alternating electromotive force between the first extremities 9 and 10 of the two parallel elongated members 1 and 2 to the alternating electric current flowing through at least one of the two parallel elongated members 1 and 2. In the actual practice of the invention, an empirically obtained mathematical equation instead of equation (5) or (6) should be used, and the numerical values of C and $\Omega$ and other circuit parameters must be determined by calibrating the position sensor, wherein the measuring instrument 15 measures the numerical values of the drop $\Delta E$ and the current I of the alternating electrical signal supplied by the power source 8, and the electronic date processor 16 determines the position of the target member 3 as a function of the ratio of drop of the electromotive force $\Delta E$ to the electric current I.

Figure 2:
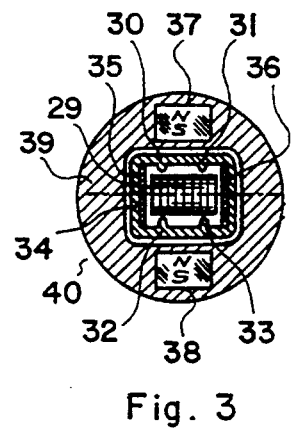
FIG. 2 illustrates a cross section of an embodiment of the position sensor operating on the principles of the present invention.
Figure 3:
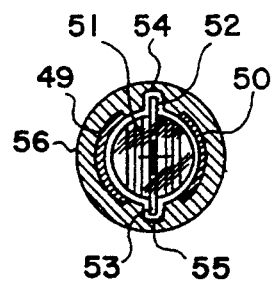
FIG. 3 illustrates a cross section of another embodiment of the position sensor.
Figure 4:
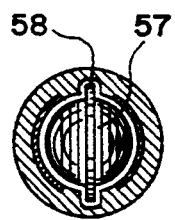
FIG. 4 illustrates a cross section of a further embodiment of the position sensor.
Figure 5:
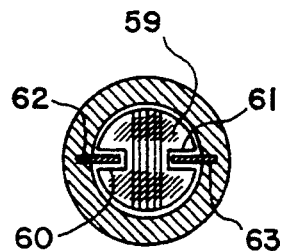
FIG. 5 illustrates a cross section of yet another embodiment of the position sensor.
Figures 6, 7:
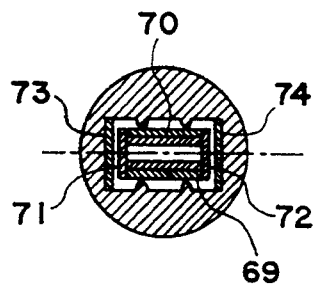
FIG. 6 illustrates a cross section of yet a further embodiment of the position sensor.
FIG. 7 illustrates a cross section of still another embodiment of the position sensor.
Figures 9, 10:
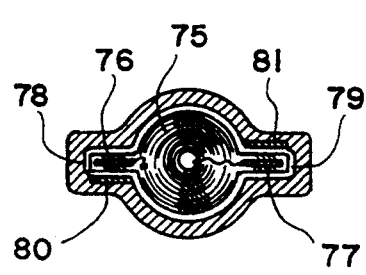
FIG. 9 illustrates a cross section of an additional embodiment of the position sensor.
FIG. 10 illustrates a cross section of other embodiment of the position sensor.
Figure 8:
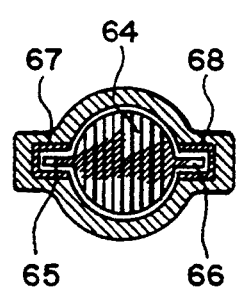
FIG. 8 illustrates a cross section of still a further embodiment of the position sensor.

In FIG. 2 through 12, there are illustrated cross sections of various embodiments of the position sensor shown and described in FIG. 1. As shown in FIG. 2 the target member 3 shown in FIG. 1 may be made of a single or multiple plates capacitor 17 that is disposed intermediate two flat elongated strips or tapes 18 and 19 constituting the two parallel elongated members 1 and 2 shown in FIG. 1. It is important that the two opposite end faces 20 and 21 of the capacitor target 17 respectively maintain a close and parallel proximity relationship with the inside surfaces 22 and 23 of the two elongated strips or tapes 18 and 19 in an insulating relationship therebetween, for which reason, at least one of the target member 17 and the two elongated strips or tapes 18 and 19 must be clad or coated with insulating material. The guide rails 24, 25, 26 and 27 supported by the tubing 28 guides the movement of the capacitor target member 17. The movement of the capacitor target member following the two parallel elongated strips or tapes becomes significantly enhanced when the capacitor target member has a the shape of a circular cylindrical roller 29 comprising single or multiple plates, that rolls on the guide rails 30, 31, 32 and 33 built into the tubing 34 housing and supporting the pair of elongated strips or tapes 35 and 36 as shown in FIG. 3. Such an embodiment is particularly useful when the force moving the capacitor target member is not a positive or very strong force, as in the case of the permanent magnets 37 and 38 included in a float 39, that slides on the tubing 34 in the embodiment of the position sensor functioning as a liquid level sensor 40. As shown in FIG. 4, the circular cylindrical capacitor target member 41 may include an axle 41 that simultaneously engages two grooves 43 and 44 respectively included in and dividing the two parallel elongated strips or tapes 45 and 46. The float 47 may include a single permanent magnet 48. The embodiment of the position sensor shown in FIG. 5 employs a pair of parallel elongated strips or tapes 49 and 50 with curved cross sections coinciding with a circular cylindrical surface, and a capacitor target member 51 of circular cylindrical shape coaxial to the two parallel elongated strips or tapes 49 and 50, which capacitor target member is guided by a pair of fins 52 and 53 respectively engaging two guide grooves 54 and 55 included in the tubing 56. The circular cylindrical capacitor target member 51 shown in FIG. 5 may be replaced with a capacitor target member 57 of a spherical shape with a circular guide fin 58, as shown in FIG. 6. As shown in FIG. 7, the capacitor target member 59 of a circular cylindrical shape may include two grooves 60 and 61 extending into the circular cylindrical surface thereof in a diametrically opposing relationship, wherein the two grooves 60 and 61 are respectively engaged by two parallel elongated strips or tapes 62 and 63 in a sliding relationship. This embodiment is particularly preferrable in view that the two parallel elongated strips or tapes 62 and 63 disposed on a common plane have a minimum capacitance therebetween, and the inter-facing surfaces between the grooves 60 and 61, and the two parallel elongated strips or tapes 62 and 63 provide a good deal of coupling capacitance between the two parallel strips or tapes 62 and 63. The same advantage provided by the embodiment shown in FIG. 7 can be attained by employing a capacitor target member 64 of a circular cylindrical shape, that has two oppositely extending fins 65 and 66 respectively engaging two guide grooves lined with the two parallel elongated strips or tapes 67 and 68, respectively, as shown in FIG. 8. A circular cylindrical capacitor target member 69 may have a coaxially wound capacitor 70 connecting the two end capacitor plates 71 and 72 of the circular cylindrical capacitor target member capacitively coupling the two parallel elongated strips or tapes 73 and 74 to one another, as shown in FIG. 9. The capacitor target shown in FIG. 10 is also made of a coaxially wound capacitor connecting the two planar fins 76 and 77 to one another, which two planar fins 76 and 77 respectively engage two guide grooves 78 and 79 lined with the two parallel elongated strips or tapes 80 and 81, respectively. The capacitor target member 82 shown in FIG. 11 employs a circular disc capacitor sandwiched between two hemispherical insulators that guides the capacitor target member 82 through a circular hole 83 with two guide grooves 84 and 85 engaged by the peripheral edge of the circular disc capacitor 82, wherein the two parallel elongated strips or tapes 86 and 87 respectively lines one side surface of the two guide grooves 84 and 85 in an arrangement wherein the two parallel elongated strips or tapes 86 and 87 are respectively located on two opposite sides of the circular disc capacitor 7. It is readily realized that the circular plate capacitor 87 can be replaced with an annular plate capacitor slipped into a groove included in a dielectric sphere playing the same role as the combination of the two hemispherical spheres sandwiching the circular disc capacitor 82. In FIG. 12, there is illustrated a capacitor target 88 comprising two circular discs 89 and 90 assembled into a roller with an axle 91 engaging two guide grooves 92 and 93. One of the two parallel elongated strips or tapes 94 and 95 straddles the outer surfaces of the two circular discs 89 and 90, and the other thereof extends into a gap between the two circular discs 89 and 90. Of course, the two opposite stub ends of the axle 91 and the pair of guide grooves 92 and 93 can be omitted or the two opposite stub ends of the axle 91 can be replaced with two hemispherical guides respectively engaging two semicircular guide grooves as shown in FIG. 11 without sacrificing the performance of the position sensor.

In FIG. 13 there is illustrated an embodiment of the position sensor operating on the principles of the present invention, which comprises a coaxial combination of a tubular elongated member 96 and an elongated rod 97, and a capacitor target member 98 including a single or multiple layers of coaxially wound metallic planar member, that slides on the elongated rod 97; and another version of operating principles taught by the present invention. It should be understood that at least one of the two elongated members 96 and 97 has a high specific ohmic resistance. A power supply 99 supplies two different alternating electromotive forces respectively oscillating at two different circular frequencies $\Omega_1$ and $\Omega_2$ to the first extremity 100 of one of the two elongated members 96 and 97, while two input terminals of a phase angle measuring device 101 are respectively connected to the first extremities 100 and 102 of the two elongated members 96 and 97. It follows from equation (1) that $$\tan\Delta\phi_1 = \left[\frac{1}{\omega_1(C+C_0)} - \omega_1 L_0\right]/(\alpha h\Omega + R_0), \quad (7)$$

and $$\tan\Delta\phi_2 = \left[\frac{1}{\omega_2(C+C_0)} - \omega_2 L_0\right]/(\alpha h\Omega + R_0), \quad (8)$$

When equations (7) and (8) are combined to eliminate the capacitance $(C + C_0)$, the following equation results:

$$h = \left[\frac{(\omega_2^2 - \omega_1^2)L_0}{\omega_1 \tan\Delta\phi_2 - \omega_2 \tan\Delta\phi_1} - R_0\right]/\alpha\Omega, \quad (9)$$

where the numerical values of $(\alpha\Omega)$, $L_0$ and $R_0$ are determined empirically by calibrating the position sensor. When the resistance $R_0$ of the connecting wire is negligibly small, equation (9) reduces to a simpler form $$h = \frac{(\omega_2^2 - \omega_1^2)L_0}{\alpha\Omega(\omega_1\tan\Delta\phi_2 - \omega_2\tan\Delta\phi_1)}. \tag{10}$$

According to equation (9) or (10), the position h of the capacitance target member 98 can be determined as a function of two phase angle differences $\Delta\phi_1$ and $\Delta\phi_2$ respectively created by two alternating electromotive forces of circular frequencies $\omega_1$ and $\omega_2$ independent of the numerical value of the coupling capacitance C and the line capacitance $C_O$. The data processor 103 receiving the information on the two different phase angle differences $\Delta\phi_1$ and $\Delta\phi_2$ from the phase angle detector 101, executes the algorithm required to determine the position of the target. When the coupling capacitance C provided by the capacitance target member 98 does not remain a constant during the movement thereof following the pair of elongated members 96 and 97, equation (10) or an empirical counter-part thereof should be used in place of equation (2) or (3) in determining the position of the capacitance target member. It should be understood that one of equations (2), (3), equation (9) or (10) may be used in determining the position of the target member with the type of position sensor shown in FIG. 1 or with the type of position sensor shown in FIG. 13. It should be noticed that the method defined by equation (9) or (10), or the empirical counter-parts thereof require that the inductance $L_0$ of the connecting wire must have a finite value, for which reason an inductance element 104 is added into the connecting wire.

It follows from equation (4) that $$\left(\frac{\Delta E_1}{I_1}\right)^2 = \left[\frac{1}{\omega_1(C + C_0)} - \omega_1 L_0\right]^2 + (\alpha h\Omega + R_0)^2, \tag{11}$$

and $$\left(\frac{\Delta E_2}{I_2}\right)^2 = \left[\frac{1}{\omega_2(C + C_0)} - \omega_2 L_0\right]^2 + (\alpha h\Omega + R_0)^2 \tag{12}$$

When equations (11) and (12) are combined to eliminate $(C + C_0)$, the following equation results:

$$\sqrt{\left(\frac{\Delta E_1}{I_1}\right)^2 - (\alpha h\Omega + R_0)^2} - \sqrt{\left(\frac{\Delta E_2}{I_2}\right)^2 - (\alpha h\Omega + R_0)^2} = (\omega_2^2 - \omega_1^2)L_0. \tag{13}$$

The equation (13) can be solved for the position h of the target member as a function of the measured values of $(\Delta E_1/I_1)$ and $(\Delta E_2/I_2)$. When the circuit parameter is set in such a way that the total reactance is much greater than the total resistance of the electric circuit shown in FIG. 13, the solution of equation (13) may be found in the following approximate form:

$$h = \frac{\sqrt{2\frac{\Delta E_1}{I_1}\frac{\Delta E_2}{I_2}\left\{\left[(\omega_2^2 - \omega_1^2)L_0 / \left(\frac{\Delta E_2}{I_2} - \frac{\Delta E_1}{I_1}\right) + 1\right]\right\}} - R_0}{\alpha\Omega}. \tag{14}$$

Figure 17:
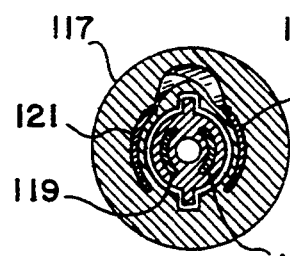
FIG. 17 illustrates a cross section of an embodiment of the liquid level sensor.

In the actual practice of the invention, an empirically determined mathematical relationship representing equation (13) or equivalent to equation (14) must be used, wherein the measurement instrument 104 measures $(\Delta E_1/I_1)$ and $(\Delta E_2/I_2)$, and the data processor 105 executes the algorithm required to determine the position h of the target member as a function of the two measured parameters by using the empirically obtained mathematical relationship therebetween. It should be understood that the method based on equation (5), (6) or (14), or the empirical counter-part thereof can be used with different embodiments of the position sensor such as the embodiments shown in FIGS. 1 and 13. In FIG. 17, there is illustrated a cross section of an embodiment of the position sensor having a coaxial structure such as that shown in FIG. 13, wherein the capacitance target member 98 is made of a hollow metallic cylinder or a coaxially wound capacitor with a central hole receiving the central rod 97 forming one of the two elongated members with high specific ohmic resistance.

In FIG. 15, there is illustrated another embodiment of the position sensor having a coaxial structure similar to the embodiment shown in FIG. 13, and a further version of the operating principles taught by the present invention. It should be noticed that the two opposite ends of the circular cylindrical capacitor target member 106 have conical shape, whereby the central hole 107 receiving the elongated central rod 108 of a small diameter has a greater length than the outer cylindrical surface of the capacitance target member 106, surrounded by the elongated hollow cylindrical member 109, whereby the capacitance target member 106 provides two balanced surface areas respectively forming a capacitive coupling with the inner and outer elongated members 108 and 109. The power supply 110 alternatively supplies an alternating electromotive force to the two opposite extremities of one of the two elongated members 108 and 109, while two phase angle detectors 111 and 112 respectively measure two phase angle differences between the first extremities and between the second extremities of the combination of the two elongated members 108 and 110. It follows from equation (1) that $$\tan\Delta\phi_1 = \left[\frac{1}{\omega(C + C_1)} - \omega L_1\right] / (\alpha h\Omega + R_1), \tag{15}$$

and $$\tan\Delta\phi_2 = \left[\frac{1}{\omega(C + C_2)} - \omega L_2\right] / [\alpha(h_0 - h)\Omega + R_2], \tag{16}$$

where $h_0$ is the total length of the combination of the two elongated members 108 and 109, and $C_1$ and $C_2$, $L_1$ and $L_2$, and $R_1$ and $R_2$, are the capacitances, inductances, and the resistances respectively belonging to the two connecting wires extending from the two opposite extremities of the combination of the two elongated members 108 and 109, respectively. When equations (15) and (16) are combined to eliminate the coupling capacitance C, the following equation results:

$$\frac{1}{(ah\Omega + R_1)\tan\Delta\phi_1 + \omega L_1} - \frac{1}{a[(h_0 - h)\Omega + R_2]\tan\Delta\phi_2 + \omega L_2} = \omega(C_1 - C_2). \quad (17)$$

The equation (17) can be solved for the position h of the target member. Consequently, the position of the target member can be determined as a function of the two phase angle differences $\Delta\phi_1$ and $\Delta\phi_2$ by using an empirically determined mathematical relationship representing equation (17). When the electric circuit parameters belonging to the two connecting wires respectively extending from the two opposite extremities of the combination of the two elongated members 108 and 109 are matched, equation (17) reduces to the form $$\frac{h}{h_0} = \frac{\tan\Delta\phi_2}{\tan\Delta\phi_1 + \tan\Delta\phi_2} - \frac{R}{ah_0\Omega}. \quad (18)$$

When the resistance R belonging to each of the two connecting wires is negligibly small, equation (18) becomes further simplified to the following form:

$$\frac{h}{h_0} = \frac{\tan\Delta\phi_2}{\tan\Delta\phi_1 + \tan\Delta\phi_2}. \quad (19)$$

According to equations (17), (18) and (19), the position of the target member can be determined as a function of measured values of the phase angle differences $\Delta\phi_1$ and $\Delta\phi_2$ independent of the actual value of the coupling capacitance C by using empirically obtained mathematical relationships equivalent to the equations (17), (18) or (19), which method of determining the position of the capacitance target member can be used with all types of the position sensor such as those shown in FIGS. 1, 13 and 15. In actual practice, the data processor 113 executes the algorithm required to determine the position of the capacitance target member as a function of the two phase angle differences respectively measured by the two phase detectors 111 and 112. In a revised design, a single phase angle detector with a switching system may be used to measure the two phase angle differences $\Delta\phi_1$ and $\Delta\phi_2$ in place of the two phase angle detectors 111 and 112.

It follows from equation (4) that $$\left(\frac{\Delta E_1}{I_1}\right)^2 = \left[\frac{1}{\omega(C + C_1)} - \omega L_1\right]^2 + (ah\Omega + R_1)^2, \quad (20)$$

and $$\left(\frac{\Delta E_2}{I_2}\right)^2 = \left[\frac{1}{\omega(C + C_2)} - \omega L_2\right]^2 + [a(h_0 - h)\Omega + R_2]^2. \quad (21)$$

When equations (20) and (21) are combined to eliminate the coupling capacitance C, the following equation results:

$$\left[\sqrt{\left(\frac{\Delta E_1}{I_1}\right)^2 - (ah\Omega + R_1)^2} + \omega L_1\right]^{-1} - \left[\sqrt{\left(\frac{\Delta E_2}{I_2}\right)^2 - [a(h_0 - h)\Omega + R_2]^2} + \omega L_2\right]^{-1} = \omega(c_1 - C_2). \quad (22)$$

The equation (22) can be solved for the position h of the capacitance target member. When the electric circuit parameters belonging to the two connecting wires respectively extending from the two opposite extremities of the combination of two elongated member 108 and 109 are matched, equation (22) reduces to the form $$\frac{h}{h_0} = \frac{1}{2}\left\{ah_0 + \frac{2R}{\Omega} + \frac{1}{ah_0\Omega}\left[\left(\frac{\Delta E_1}{I_1}\right)^2 - \left(\frac{\Delta E_2}{I_2}\right)^2\right]\right\}. \quad (23)$$

When the resistance belonging to each of the two connecting wires respectively extending from the two opposite extremities of the combination of the two elongated members 108 and 109 is negligibly small, equation (23) further simplifies to equation $$\frac{h}{h_0} = \frac{1}{2}\left\{ah_0 + \frac{1}{ah_0\Omega}\left[\left(\frac{\Delta E_1}{I_1}\right)^2 - \left(\frac{\Delta E_2}{I_2}\right)^2\right]\right\}. \quad (24)$$

According to equations (22), (23) or (24), the position h of the capacitance target member 106 can be determined as a function of two ratios between the drop in the electromotive force across the two elongated members 108 and 109 to the electric current flowing through at least one of the two elongated members 108 and 109, respectively measured at the two opposite extremities of the combination of the two elongated members 108 and 109 by using an empirically obtained mathematical relationship equivalent to equation (22), (23) or (24). It should be understood that such a method for determining the location of the capacitance target member 106 can be used with all types of the position sensor such as those shown in FIGS. 1, 13 and 15. In the actual operation, two measuring instruments 114 and 115 respectively measure the numerical values of the two ratios ($\Delta E_1/I_1$) and ($\Delta E_2/I_2$), and a data processor similar to the element 105 shown in FIG. 13 executes the algorithm required to determine the position of the capacitance target member ($\Delta E_1/I_1$) and ($\Delta E_2/I_2$) by using an empirically obtained mathematical relationship therebetween. In an alternative design, a single instrument with switching can measure the numerical values of ($\Delta E_1/I_1$) and ($\Delta E_2/I_2$) in place of the two measurement instruments 114 and 115.

Figure 16:
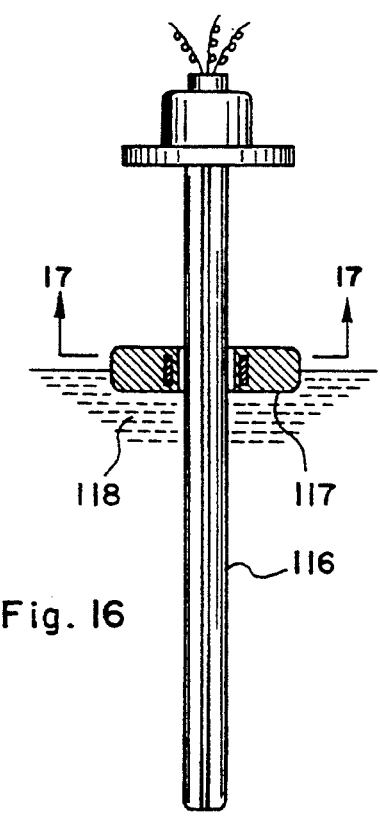
FIG. 16 illustrates an embodiment of the liquid level sensor indicating the position of the float by using the principles of position sensing taught by the present invention.

In FIG. 16 there is illustrated an embodiment of the liquid level sensor comprising an elongated container member 118 containing the pair of elongated members with high specific ohmic resistance, and a float 117 floating at the free surface of a liquid medium 118.

In FIG. 17 there is illustrated a cross section of the liquid level sensor shown in FIG. 16, which cross section is taken along plane 17—17 as shown in FIG. 16.

The elongated container member includes the pair of parallel elongated strips or tapes 119 and 120 disposed close to the circular cylindrical surface of the elongated container member 116 in a diametrically opposing relationship, wherein at least one of the two parallel elongated strips or tapes 119 and 120 has a high specific ohmic resistance. The float 117 includes a pair of capacitor plates 121 and 122 of semicircular cross section respectively maintaining a close tolerance relationship with the two elongated strips or tapes 119 and 120, wherein the inner semicircular surface of one of the two capacitor plates 121 and 122 is electrically connected to the outer semicircular surface of the other of the two capacitor plates 121 and 122 by a twisted plate with two extremities respectively connected to the extremities of the two capacitor plates 121 and 122.

Figure 18:
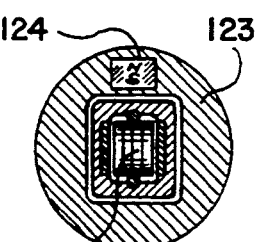
FIG. 18 illustrates a cross section of another embodiment of the liquid level sensor.

In FIG. 18 there is illustrated a cross section of another embodiment of the liquid level sensor, that has a structural embodiment similar to the embodiment shown in and described in conjunction with the embodiment shown in FIG. 3. The float 123 may include a single permanent magnet 124 or a pair of permanent magnets as shown in FIG. 3, which magnet moves the capacitance target member 125 following the liquid level. Of course, FIG. 4 illustrates a cross section of a further embodiment of the liquid level sensor.

Figure 19:
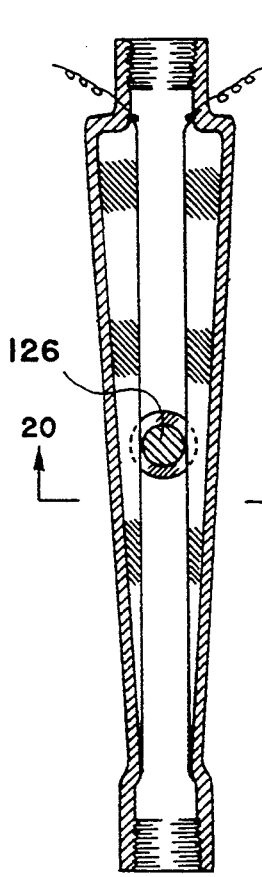
FIG. 19 illustrates an embodiment of the rotameter indicating the position of the drag target member by using the principles of position sensing taught by the present invention.

In FIG. 19, there is illustrated a cross section of an embodiment of the rotameter, wherein the position of the drag body playing the role of the capacitance target member is measured by using the principles of the position sensor taught by the present invention, which principles are described in conjunction with FIGS. 1, 13 and 15.

Figure 20:
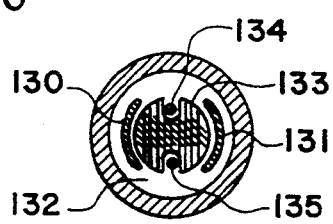
FIG. 20 illustrates a cross section of an embodiment of the rotameter.
Figure 22:
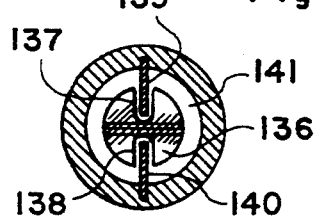
FIG. 22 illustrates a cross section of a further embodiment of the rotameter.
Figure 23:
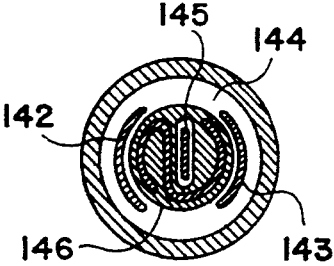
FIG. 23 illustrates a cross section of yet another embodiment of the rotameter.
Figure 21:
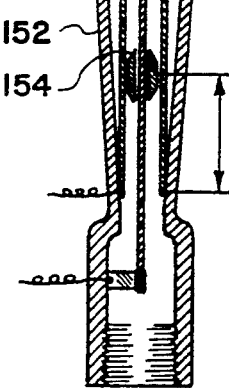
FIG. 21 illustrates a cross section of another embodiment of the rotameter.

In FIG. 20, there is illustrated a cross section of the rotameter shown in FIG. 19, which cross section is taken along plane 20—20 as shown in FIG. 19. The tapered flow passage 127 included in the rotameter has a pair of elongated fins 128 and 129 respectively extending inwardly from two diametrically opposite portions of the cylindrical wall of the tapered flow passage 127, which pair of fins respectively including the pair of elongated strips or tapes with high specific ohmic resistance guides the drag body 126 of a spherical shape with a groove disposed on a great circle on the spherical surface of the drag body 126, that plays the role of the capacitor capacitively coupling two alternating currents respectively flowing through the two elongated strips or tapes respectively built into the two fins 128 and 129. The flow rate of fluid media moving through the rotameter is determined as a function of the position of the drag body 126 measured from a reference cross section of the tapered flow passage located at the lower extremity of the tapered flow passage.

FIG. 21-23 and 25 shows cross sections of various embodiment of the rotameter. The embodiment shown in FIG. 21 employs a pair of elongated strips or tapes 130 and 131 disposed on a circular cylindrical surface coaxial to the tapered flow passage 132 in a diametrically opposing relationship, and a circular cylindrical drag body with a built-in capacitor 133 that is guided by a pair of guide wires 134 and 135 respectively engaging a pair of axial guide grooves included in the circular cylindrical surface of the drag body 133. In an alternative design, the drag body can be a solid circular cylindrical member with metallic circular cylindrical surface without any guide grooves, wherein the two guide wires 134 and 135 are omitted. The embodiment shown in FIG. 22 comprises a circular cylindrical drag body 136 with a built-in capacitor, that has a pair of axial guide grooves 137 and 138 disposed in a diametrically opposing relationship, and two elongated strips or tapes of high specific ohmic resistance respectively built into a pair of elongated fins 139 and 140 extending inwardly from two diametrically opposite portions of the cylindrical wall of the tapered flow passage 141, wherein the two elongated fins 139 and 140 respectively engage the two axial guide grooves 137 and 138 included in the cylindrical surface of the drag body 136. The embodiment shown in FIG. 23 includes a pair of elongated guide members 142 and 143 having a curved cross section disposed on a circular cylindrical surface coaxial to the tapered flow passage 144, and a central guide bar 145, wherein the pair of elongated members such as the strips or tapes of high specific ohmic resistance are respectively built into the two guide members 142 and 143. A drag body 146 of a circular cylindrical shape with a central slitted hole engaged by the central guide bar 145 provides a capacitance that capacitively couples the two elongated members respectively built into the two elongated guide members 142 and 143. It should be noticed that the capacitor plate included in the drag body 146 has a S-shaped cross section, whereby two opposite side surfaces of the capacitor plate are disposed in a face-to-face close proximity relationship respectively adjacent to the two guide members 142 and 143. The embodiment shown in FIG. 25 has the same structural embodiment as that shown in FIG. 23 with the exception of a planar elongated member or tape 147 with high ohmic resistance slidably engaging a slitted hole 148 centrally included in the drag body 149 providing the capacitive coupling. The planar elongated member 147 provides a greater surface area for the capacitive coupling between the planar elongated member 147 and at least one of the two elongated members 150 and 151 by means of the drag body 149.

Figure 24:
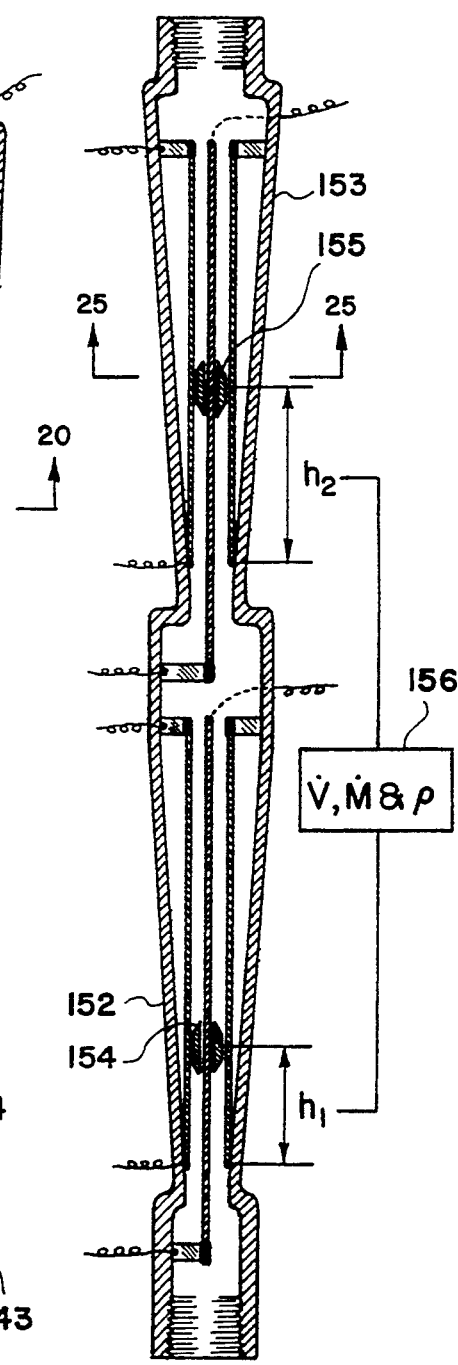
FIG. 24 illustrates an embodiment of the tandem rotameter operating on the principles of position sensing taught by the present invention.

In FIG. 24, there is illustrated a cross section of a tandem version of the rotameter, that comprises a pair of rotameters 152 and 153 disposed in a series connection, wherein the two drag bodies 154 and 155 respectively included in the two rotameters 152 and 153 have different ratios of the volume to mass of the drag body. The position of the two drag bodies $h_1$ and $h_2$ are measured by means of two position sensors operating on the principles of the present invention shown in and described in conjunction with FIGS. 19-23 and 25. The cross sectional area of the net flow passage passage included in a rotameter varies as a function of the position of a drag body h in accordance with the relationship $$A(h) = Kh \qquad (25)$$

where K is a constant of proportionality. The velocity of fluid media moving across every cross section of the tapered flow passage has to be equal to the volume flow rate divided by the net cross sectional area of the flow passage and consequently, the velocity of fluid media moving across the cross sectional area A(h) is given by equation $$u = \frac{V}{Kh}, \qquad (26)$$

where V is the volume flow rate of fluid media moving through the rotameter. The position h of the drag body is determined by the condition that matches the drag force on the drag body to the difference between the weight and buoyancy force of the drag body, which condition yields equation $$\frac{1}{2} C_{D} \rho \left( \frac{V}{Kh} \right)^2 = W - \rho V, \quad (27)$$

where $C_D$ is the drag coefficient of the drag body, $\phi$ is the density of fluid media, and W is the weight of the drag body. It follows from equation (27) that $$\frac{1}{2} C_{D} \rho \left( \frac{V}{Kh_1} \right)^2 = W_1 - \rho V, \quad (28)$$

and $$\frac{1}{2} C_{D} \rho \left( \frac{V}{Kh_2} \right)^2 = W_2 - \rho V. \quad (29)$$

When equations (28) and (29) are solved for $\phi$, the following equation results:

$$\rho = \frac{W_2 h_2^2 - W_1 h_1^2}{V(h_2^2 - h_1^2)}. \quad (30)$$

When equations (30), and one of the two equations (28) and (29) are solved for the volume flow rate V of fluid media the following equation can be found:

$$V = Kh_1 \sqrt{ \frac{2V}{C_D} \left[ \frac{W_1(h_2^2 - h_1^2)}{W_2 h_2^2 - W_1 h_1^2} - 1 \right] }. \quad (31)$$

The mass flow rate M is equal to the volume flow rate times the density of fluid media. The product between equations (30) and (31) yields equation $$M = \quad (32)$$

$$Kh_1 \frac{W_2 h_2^2 - W_1 h_1^2}{h_2^2 - h_1^2} \sqrt{ \frac{2}{C_D V} \left[ \frac{W_1(h_2^2 - h_1^2)}{W_2 h_2^2 - W_1 h_1^2} - 1 \right] }.$$

According to equations (30), (31) and (32), a tandem version of the rotameter shown in FIG. 24 does not require any fluid-by-fluid calibration. Once the numerical values of K, $C_D$, V, $W_1$ and $W_2$ are determined and entered into a memory bank of the data processor 156, the data processor 156 executes the required algorithms which determines the density, volume flow rate and mass flow rate of fluid media respectively as functions of $h_1$ and $h_2$ by using equations (30), (31) and (32), or the empirical counter-parts thereof. It should be understood that the tandem rotameter shown in FIG. 24 is an "universal rotameter" that measures volume and mass flow rate and the density of all kinds of fluid media without requiring any calibration customized to the specific fluid media.

Figure 25:
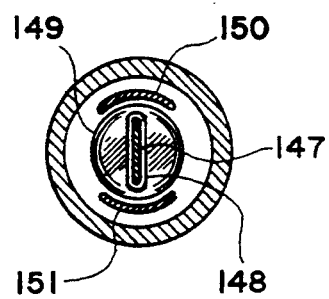
FIG. 25 illustrates a cross section of a rotameter used to construct the tandem rotameter.

In FIG. 25, there is illustrated an embodiment of the cross section of the individual rotameter, which cross section is taken along plane 25—25 as shown in FIG. 24. Other embodiments shown in FIGS. 20-23 may be employed in constructing the tandem rotameter shown in FIG. 24.

Figure 26:
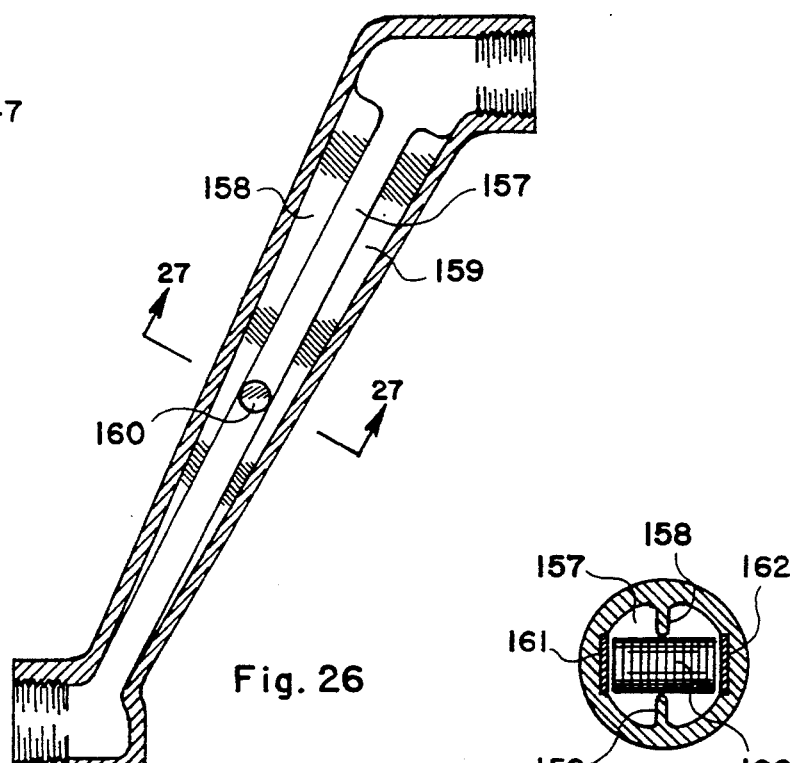
FIG. 26 illustrates an embodiment of the inclined rotameter.

In FIG. 26, there is illustrated an inclined version of the rotameter comprising the tapered flow passage 157 with flow guides 158 and 159, and a drag body 160 capacitively coupling two parallel elongated strips or tapes of high specific ohmic resistance, which rotameter is disposed in an inclined angle with respect to the vertical direction. The sensitivity of the rotameter can be varied by varying the angle of inclination of the rotameter. It is readily recognized that an inclined version of the tandem rotameter can be constructed by employing a pair of the inclined rotameters connected in series. The universal version of the inclined single or tandem rotameter can be used to measure gas flow with a large angle of inclination, and liquid flow with a small angle of inclination.

Figure 27:
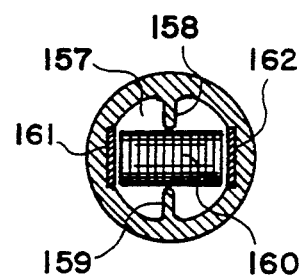
FIG. 27 illustrates a cross section of an embodiment of the inclined rotameter.

In FIG. 27, there is illustrated a cross section of an embodiment of the inclined rotameter shown in FIG. 26, which cross section is taken along plane 27—27 as shown in FIG. 26. The drag body 160 having the shape of a circular cylindrical roller with a built-in capacitor is guided by a pair of guide fins 158 and 159, which drag body 160 capacitively couples the pair of elongated strips or tapes 161 and 162 with high specific ohmic resistance built into the wall of the tapered flow passage 157.

Figure 28:
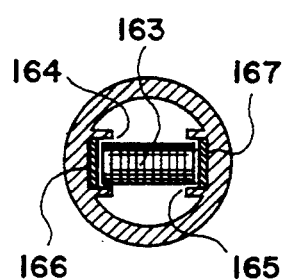
FIG. 28 illustrates a cross section of another embodiment of the inclined rotameter.

In FIG. 28 there is illustrated a cross section of another rotameter, that is a modified version of the embodiment shown in FIG. 27. The drag body 163 having the shape of a circular cylindrical roller is now guided by two guide grooves 164 and 165 respectively including the pair of elongated strips or tapes 166 and 167 embedded in the bottom of the two guide grooves 164 and 165.

Figure 29:
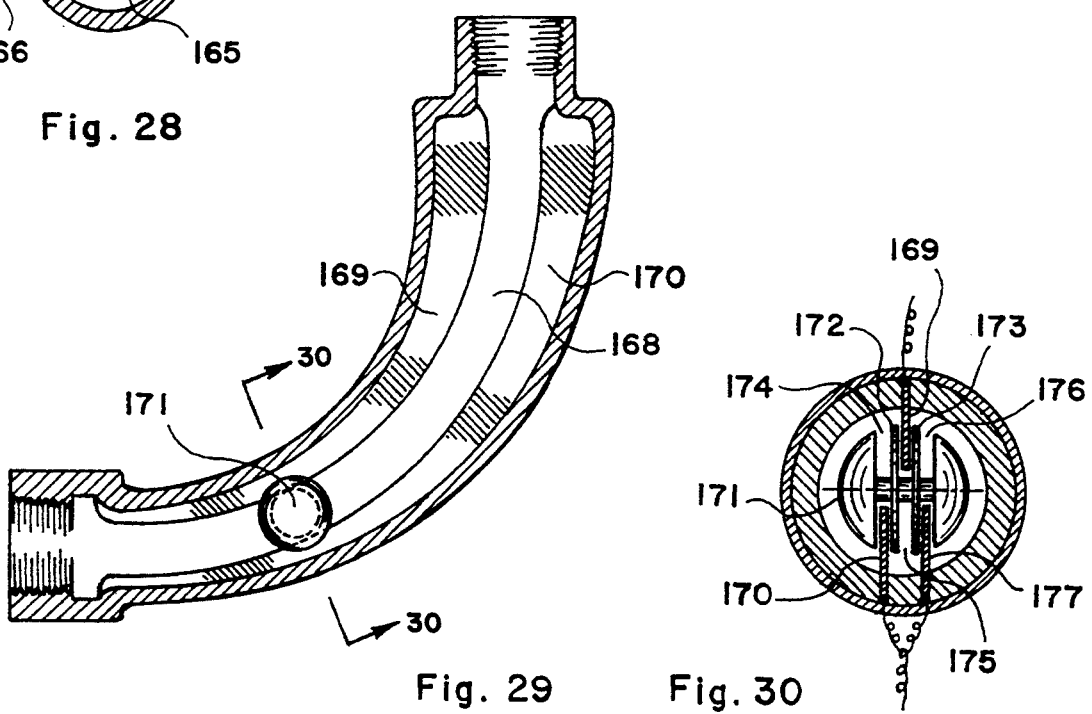
FIG. 29 illustrates an embodiment of the curved rotameter.

In FIG. 29, there is illustrated an embodiment of a curved version of the rotameter comprising a curved tapered flow passage 168 with a plurality of curved guide fins 169 and 170, and a drag body 171 guided by the plurality of guide fins 169 and 170. The curved rotameter is ideal for measuring flow of fluid media in a wide range extending over from a very low flow rate to a very high flow rate.

Figure 30:
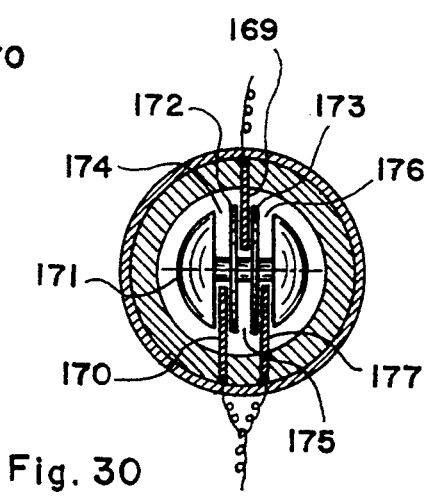
FIG. 30 illustrates a cross section of an embodiment of the curved rotameter.

In FIG. 30, there is illustrated a cross section of an embodiment of the curved rotameter shown in FIG. 29, which cross section is taken along plane 30—30 as shown in FIG. 29. The drag body 171 of a spherical geometry has two circular or annular capacitor plates 172 and 173 concentrically included in the spherical drag body 171 in an arrangement providing three annular grooves 174, 175 and 176. The guide fin 169 including an elongated strip or tape of high specific ohmic resistance engages the groove 175 intermediate the two capacitor plates 172 and 173. The other guide fins 170 and 177 respectively including a pair of elongated strips or tapes of high ohmic resistance respectively engage two grooves 174 and 176 straddling the two capacitor plates 172 and 173, which capacitor plates capacitively couples the elongated strip or tape built into the guide fin 169 to the pair of elongated strip or tapes respectively built into the other guide fins 170 and 177. In an alternative design, one of the two capacitor plates 173, one of the three grooves 176, and one of the three guide fins 177 can be omitted. It must be understood that the most desirable construction among all of the different cross sections shown in FIGS. 2-12, 14, 17, 18, 20-23, 25, 27, 28 and 30, or in other designs particularly adapted to the specific working environment can be selected in constructing the position sensor, liquid level sensors, rotameters and other devices requiring the electronic readout capabilities provided by the teaching of the present invention. It should be understood that the electrically conducting elements such as the elongated strips, tapes, wires, capacitor plates, etc., playing a role in the position sensing taught by the present invention must be clad, coated or sheathed when those elements are exposed to undesirable surroundings detrimental to the stable operation of the position sensing.

While the principles of the present inventions have now been made clear by the illustrative embodiments, there will be many modifications of the structures, arrangements, proportions, elements and materials, which are obvious to those skilled in the art and particularly adapted to the specific working environments and operating conditions, and which can be implemented in the practice of the inventions without departing from the principles of the present invention. It is not desired to limit the inventions to the particular illustrative embodiments shown and described and accordingly, all suitable modifications and equivalents may be regarded as falling within the scope of the inventions as defined by the claims which follow.

The embodiment of the inventions, in which are exclusive property or privilege is claimed, are defined as follows:

1. An apparatus for measuring position of a target member comprising in combination:
   a) at least a pair of elongated members disposed in a parallel relationship therebetween, wherein at least one of the pair of elongated members has a high ohmic resistance per unit length of the elongated member;
   b) a target member providing a capacitive electrical coupling between the pair of elongated members and disposed simultaneously adjacent to the pair of elongated members in a relationship allowing movement of the target member relative to and following a length of the combination of the pair of elongated members, wherein the target member capacitively couples two alternating electrical signals respectively flowing through the pair of elongated members;
   c) means for supplying a first alternating electrical signal oscillating at a frequency to at least one of two opposite extremities of one of the pair of elongated members;
   d) means for taking off a second alternating electrical signal oscillating at said a frequency and associated with the first alternating electrical signal from one extremity of the other of the pair of elongated members located on one side of the target member; and
   e) means for measuring a phase angle difference between the first and second alternating electrical signal as a measure of position of the target member.

2. An apparatus as defined in claim 1 wherein said combination includes means for determining position of the target member with respect to a reference section stationary relative to the pair of elongated members as a function of the phase angle difference between the first and second alternating electrical signal.

3. An apparatus as defined in claim 2 wherein the pair of elongated members are disposed following an elongated structural member extending across a free surface of liquid media, and the target member is included in a float mounted on the elongated structural member in a freely sliding relationship and floating on the free surface of liquid media; wherein said means for determining position of the target member provides information on position of the free surface of liquid media.

4. An apparatus as defined in claim 2 wherein the pair of elongated members are disposed following an elongated tubular structural member having a sealed off interior space and extending across a free surface of liquid media, and the target member is disposed within the elongated tubular structural member in a relationship allowing the target member to move freely following a length of the elongated tubular structural member; and a float floating on the free surface of liquid media is mounted on the elongated tubular structural member in a freely sliding relationship, said float including at least one permanent magnet attracting the target member and moving the target member following movement of the float; wherein said means for determining position of the target member provides information on position of the free surface of liquid media.

5. An apparatus as defined in claim 2 wherein the pair of elongated members are disposed following a tapered flow passage included in a rotameter and the target member is built into a drag body disposed within the tapered flow passage in a relationship allowing fluid media moving through the tapered flow passage to lift up the drag body to different positions depending on velocity of fluid media; wherein said means for determining position of the target member provides information on flow rate of fluid media moving through the tapered flow passage.

6. An apparatus as defined in claim 1 wherein said combination includes means for supplying a third alternating electrical signal oscillating at another frequency to at least one of two opposite extremities of said one of the pair of elongated members, means for taking off a fourth alternating electrical signal oscillating at said another frequency and associated with the third alternating electrical signal from said one extremity of the other of the pair of elongated members, and means for measuring a phase angle difference between the third and fourth alternating electrical signal; and means for determining position of the target member as a function of the phase angle difference between the first and second alternating electrical signal and the phase angle difference between the third and fourth alternating electrical signal in a relationship independent of numerical value of electrical capacitance associated with the target member capacitively coupling two alternating electrical signals respectively flowing through the pair of elongated members.

7. An apparatus as defined in claim 6 wherein the pair of elongated members are disposed following an elongated structural member extending across a free surface of liquid media, and the target member is included in a float mounted on the elongated structural member in a freely sliding relationship and floating on the free surface of liquid media; wherein said means for determining position of the target member provides information on position of the free surface of liquid media.

8. An apparatus as defined in claim 6 wherein the pair of elongated members are disposed following an elongated tubular structural member having a sealed off interior space and extending across a free surface of liquid media, and the target member is disposed within the elongated tubular structural member in a relationship allowing the target member to move freely following a length of the elongated tubular structural member; and a float floating on the free surface of liquid media is mounted on the elongated tubular structural member in a freely sliding relationship, said float including at least one permanent magnet attracting the target member and moving the target member following movement of the float; wherein said means for determining position of the target member provides information on position of the free surface of liquid media.

9. An apparatus as defined in claim 6 wherein the pair of elongated members are disposed following a tapered flow passage included in a rotameter and the target member is built into a drag body disposed within the tapered flow passage in a relationship allowing fluid media moving through the tapered flow passage to lift up the drag body to different positions depending on velocity of fluid media; wherein said means for determining position of the target member provides information on flow rate of fluid media moving through the tapered flow passage.

10. An apparatus as defined in claim 1 wherein said combination includes means for taking off a third alternating electrical signal oscillating at said a frequency and associated with the first alternating electrical signal from the other extremity of the other of the pair of elongated members located on the other side of the target member opposite to said one side, means for measuring a phase angle difference between the first and third alternating electrical signal, and means for determining position of the target member as a function of the phase angle difference between the first and second alternating electrical signal and the phase angle difference between the first and third alternating electrical signal in a relationship independent of numerical value of electrical capacitance associated with the target member capacitively coupling two alternating electrical signals respectively flowing through the pair of elongated members.

11. An apparatus as defined in claim 10 wherein the pair of elongated members are disposed following an elongated structural member extending across a free surface of liquid media, and the target member is included in a float mounted on the elongated structural member in a freely sliding relationship and floating on the free surface of liquid media; wherein said means for determining position of the target member provides information on position of the free surface of liquid media.

12. An apparatus as defined in claim 10 wherein the pair of elongated members are disposed following an elongated tubular structural member having a sealed off interior space and extending across a free surface of liquid media, and the target member is disposed within the elongated tubular structural member in a relationship allowing the target member to move freely following a length of the elongated tubular structural member; and a float floating on the free surface of liquid media is mounted on the elongated tubular structural member in a freely sliding relationship, said float including at least one permanent magnet attracting the target member and moving the target member following movement of the float; wherein said means for determining position of the target member provides information on position of the free surface of liquid media.

13. An apparatus as defined in claim 10 wherein the pair of elongated members are disposed following a tapered flow passage included in a rotameter and the target member is built into a drag body disposed within the tapered flow passage in a relationship allowing fluid media moving through the tapered flow passage to lift up the drag body to different positions depending on velocity of fluid media; wherein said means for determining position of the target member provides information on flow rate of fluid media moving through the tapered flow passage.

14. An apparatus for measuring position of a target member comprising in combination:
   a) at least a pair of elongated members disposed in a parallel relationship therebetween, wherein at least one of the pair of elongated members has a high ohmic resistance per unit length of the elongated member;
   b) a target member providing a capacitive electrical coupling between the pair of elongated members and disposed simultaneously adjacent to the pair of elongated members in a relationship allowing movement of the target member relative to and following a length of the combination of the pair of elongated members, wherein the target member capacitively couples two alternating electrical signals respectively flowing through the pair of elongated members;
   c) means for supplying a first alternating electrical signal oscillating at a frequency to at least one of two opposite extremities of one of the pair of elongated members;
   d) means for taking off a second alternating electrical signal oscillating at said a frequency and associated with the first alternating electrical signal from one extremity of the other of the pair of elongated members located on one side of the target member;
   e) means for measuring amplitude of the first alternating electrical signal and amplitude of the second alternating electrical signal; and
   f) means for determining position of the target member with respect to a reference section stationary relative to the pair of elongated members as a function of the amplitudes of the first and second alternating electrical signal.

15. An apparatus as defined in claim 14 wherein the pair of elongated members are disposed following an elongated structural member extending across a free surface of liquid media, and the target member is included in a float mounted on the elongated structural member in a freely sliding relationship and floating on the free surface of liquid media; wherein said means for determining position of the target member provides information on position of the free surface of liquid media.

16. An apparatus as defined in claim 14 wherein the pair of elongated members are disposed following an elongated tubular structural member having a sealed off interior space and extending across a free surface of liquid media, and the target member is disposed within the elongated tubular structural member in a relationship allowing the target member to move freely following a length of the elongated tubular structural member; and a float floating on the free surface of liquid media is mounted on the elongated tubular structural member in a freely sliding relationship, said float including at least one permanent magnet attracting the target member and moving the target member following movement of the float; wherein said means for determining position of the target member provides information on position of the free surface of liquid media.

17. An apparatus as defined in claim 14 wherein the pair of elongated embers are disposed following a tapered flow passage included in a rotameter and the target member is built into a drag body disposed within the tapered flow passage in a relationship allowing fluid media moving through the tapered flow passage to lift up the drag body to different positions depending on velocity of fluid media; wherein said means for determining position of the target member provides information on flow rate of fluid media moving through the tapered flow passage.

18. An apparatus as defined in claim 14 wherein said combination includes means for supplying a third alternating electrical signal oscillating at another frequency to at least one of two opposite extremities of said one of the pair of elongated members, means for taking off a fourth alternating electrical signal oscillating at said another frequency and associated with the third alternating electrical signal from said one extremity of the other of the pair of elongated members, and means for measuring amplitude of the third alternating electrical signal and amplitude of the fourth alternating electrical signal; wherein said means for determining position of the target member determines position of the target as a function of the amplitudes of the first, second, third and fourth alternating electrical signal in a relationship independent of numerical value of electrical capacitance associated with the target member capacitively coupling two alternating electrical signals respectively flowing through the pair of elongated members.

19. An apparatus as defined in claim 14 wherein said combination includes means for taking off a third alternating electrical signal oscillating at said a frequency and associated with the first alternating electrical signal from the other extremity of the other of the pair of elongated members located on the other side of the target member opposite to said one side, and means for measuring amplitude of the third alternating electrical signal; wherein said means for determining position of the target member determines position of the target member as a function of the amplitudes of the first, second and third alternating electrical signal in a relationship independent of numerical value of electrical capacitance associated with the target member capacitively coupling two alternating electrical signals respectively flowing through the pair of elongated members.

20. An apparatus as defined in claim 19 wherein the pair of elongated members are disposed following an elongated structural member extending across a free surface of liquid media, and the target member is included in a float mounted on the elongated structural member in a freely sliding relationship and floating on the free surface of liquid media; wherein said means for determining position of the target member provides information on position of the free surface of liquid media.

* * * * *